Figure 3:
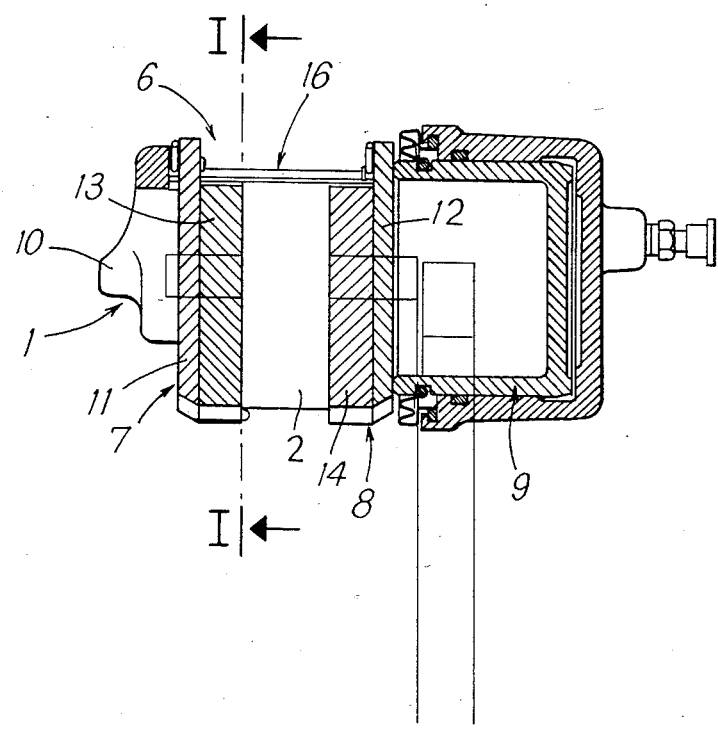

United States Patent [19]

Tourneur

[11] Patent Number: 4,560,036
[45] Date of Patent: Dec. 24, 1985

[54] DISC BRAKE

[75] Inventor: Roger Tourneur, Pontaut Combault, France

[73] Assignee: Societe Anonyme D.B.A., Paris, France

[21] Appl. No.: 568,478

[22] Filed: Jan. 5, 1984

[30] Foreign Application Priority Data

Jan. 12, 1983 [FR] France .................. 83 00388

[51] Int. Cl.$^4$ .............................. F16D 65/02
[52] U.S. Cl. ................... 188/73.32; 188/73.45
[58] Field of Search .............. 188/73.43, 73.44, 73.45, 188/73.32, 73.31, 73.34, 73.35, 73.36, 73.37, 73.38, 73.39, 73.1, 71.1

[56] References Cited

U.S. PATENT DOCUMENTS

| 3,917,032 | 11/1975 | Hoffman, Jr. et al. | 188/73.44 |
| 4,129,200 | 12/1978 | Johannesen | 188/73.47 X |
| 4,174,769 | 11/1979 | Gerard | 188/73.32 |
| 4,274,514 | 6/1981 | DuCharme et al. | 188/73.44 |
| 4,310,075 | 1/1982 | Johannesen et al. | 188/73.45 |

FOREIGN PATENT DOCUMENTS

| 0035946 | 9/1981 | European Pat. Off. | |
| 0080949 | 6/1983 | European Pat. Off. | 188/73.38 |
| 2378209 | 8/1978 | France | |
| 2409423 | 6/1979 | France | 188/73.45 |
| 2412752 | 7/1979 | France | |
| 2014674 | 8/1979 | United Kingdom | |

Primary Examiner—Duane A. Reger
Assistant Examiner—Michael P. Gilday
Attorney, Agent, or Firm—Larry J. Palguta; Ken C. Decker

[57] ABSTRACT

The subject of the invention is a disc brake of the type with a caliper (1) mounted to slide on a fixed support (5, 30) by means of two pins (3, 4). The caliper incorporates a brake motor (9) which is capable of stressing an inner pad (8) directly and an outer pad (7) via the sliding caliper (1) to engage frictionally with a brake disc (2). According to the invention, the caliper (1) is located without appreciable play between a front stop (26) and a rear stop (27) placed respectively opposite a front end (24) and a rear end (25) of the caliper. Depending on the direction of rotation of the disc (2), one or the other of these stops (26, 27) fixed to the fixed support (5, 30) receives all or some of the forces generated by the pads (7, 8) and transmitted to the caliper (1) with which the pads (7, 8) interact.

5 Claims, 3 Drawing Figures

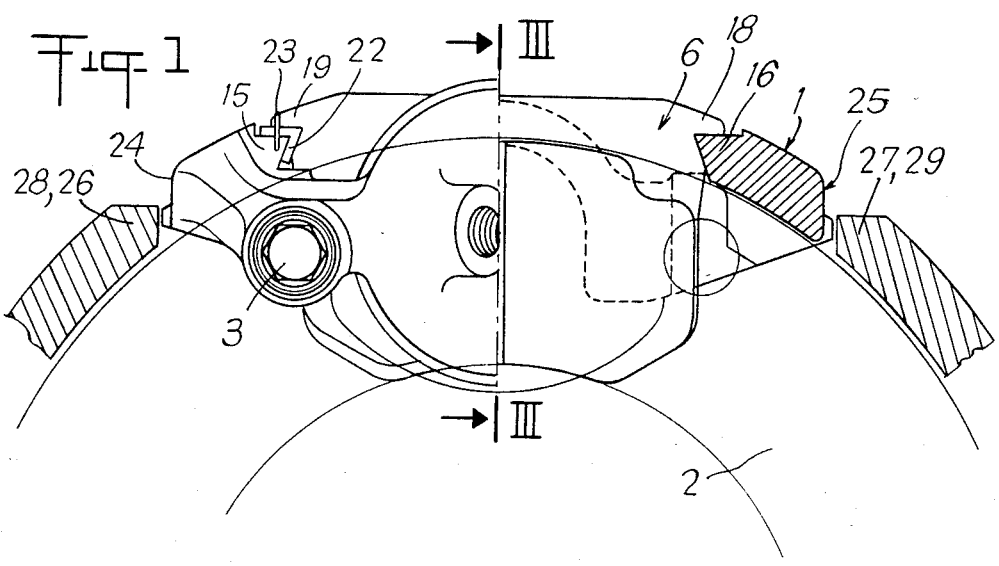
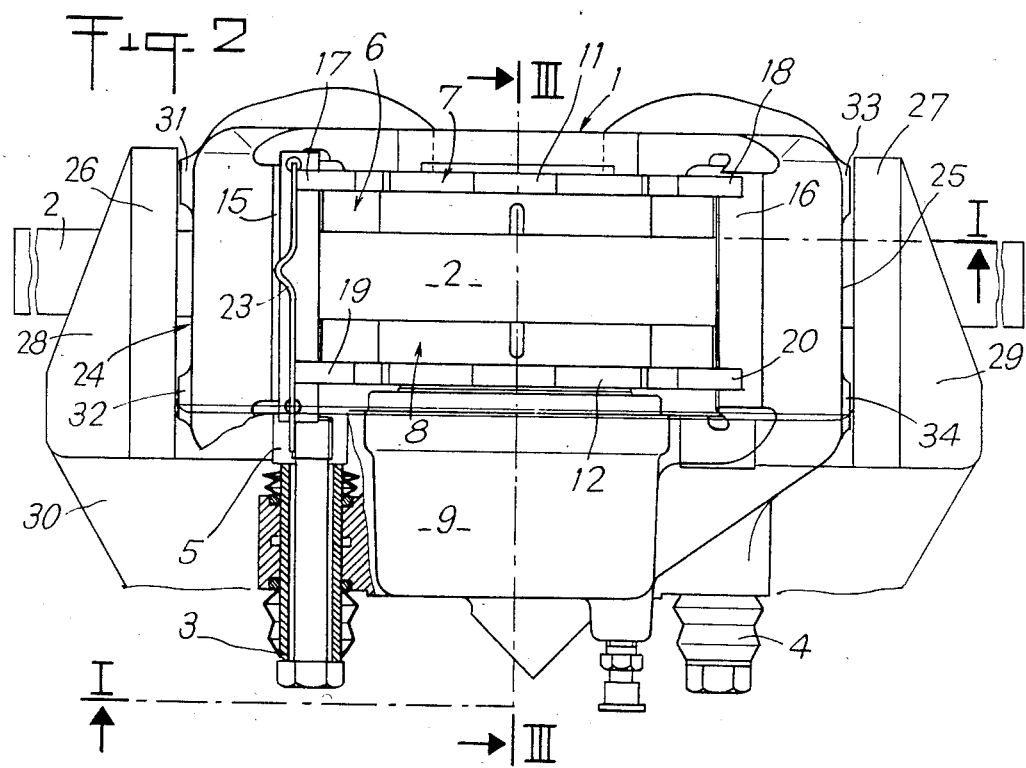

DISC BRAKE

The present invention relates to a disc brake of the type incorporating a sliding caliper which is located above a peripheral part of a brake disc and which has, on the one hand, a rectangular peripheral passage orifice delimited by two guide edges parallel to the axis of said disc and by two edges parallel to the side faces of said disc and, on the other hand, bearing and guide faces parallel to the radial plane passing through the center of said passage orifice and located on either side of the brake disc at least approximately in line with the guide edges, two friction pads located in the caliper on either side of the brake disc and attached by means of their end bearing noses on the guide edges and resting against the bearing and guide faces of the caliper, a locking key capable of being introduced into the gap delimited by a guide edge and the adjacent bearing noses of the pads and serving to prevent any untimely radial movement of the latter, a fixed support secured to a frame and serving as a rest for the caliper, two support and guide pins parallel to the axis of the disc, secured to the fixed support and guiding the caliper by means of corresponding bearings formed in said caliper, and a brake motor mounted on the inner part of the caliper and capable of stressing the inner pad in the direction of the outer pad which bears against the caliper head.

This type of disc brake is known, for example, from French Pat. No. 77/34,537 (publication No. 2,409,423). Guidance of the caliper by means of two pins requires, in the first place, a high machining accuracy of the parts sliding relative to one another and substantial dimensions for the pins since they serve to transmit to the fixed support the braking torque received by the friction pads and subsequently absorbed by the caliper.

To avoid the disadvantages associated with the use of a pair of pins, French Pat. No. 1,316,440 has likewise proposed mounting the caliper in a floating fashion in the notches which are aligned parallel to the axis of the brake disc and which are provided in two fixed parallel support plates located on either side of the brake disc and connected to one another, above the said disc, by means of two cylindrical connecting sheets, leaf springs being interposed between each lateral flank of a notch and a front or rear end of a friction pad. When the pads are clamped against the brake disc, the latter causes the caliper to pivot until it bears, by means of corresponding spring parts, against the lateral flanks located downstream of the notches, that is to say downstream in the direction of rotation of the brake disc. This floating mounting of the caliper results in considerable deflection of the caliper which is thrown violently against the springs and subsequently the corresponding lateral flanks of the notches of the support plates especially in the event of sudden braking. Because the loop-shaped part of the suspension springs is interposed, the latter are first to absorb the sudden forces and often break. From that moment, the caliper is no longer held correctly and risks becoming locked in an oblique position detrimental to any correct and efficient braking.

The object of the present invention is to eliminate the disadvantages mentioned above and to propose a disc brake, especially of the type mentioned initially, which, while having a reduced bulk especially as regards the pins, makes it possible to ensure correct braking without inadmissible deformation of the members constituting the brakes.

This object is achieved according to the invention due to the fact that by means of its front and rear ends the caliper is placed without appreciable play between a front stop and a rear stop, that each of these stops extends parallel to the axis of the brake disc above the latter over a length at least equal to the width of the space occupied by the two friction pads, and that each of these stops is secured to a lateral fixed support provided on the inner side of the brake disc.

By means of this design, the braking torque is absorbed partly by one of the stops and the corresponding fixed support and partly by the two pins and their fixed support. It will also be understood that because of this, with an equal maximum load, the pins can have reduced dimensions and that the load distribution prevents the pins from being twisted or deformed. The result of this is, also, that the pads work parallel to the brake disc so that the braking effect is uniform.

The two rear and front stops can each be provided on a lateral supporting arm secured to the fixed support, and this fixed support can likewise serve as a rest for the pins of the caliper.

Moreover, to ensure that the caliper is inserted accurately and practically without play between the two stops, it is advantageous to provide, on the front face and the rear face of the caliper which are intended to interact with the corresponding stop, two lateral bearing heads located opposite the ends of each bar-shaped stop.

The subject of the invention will be described below in the form of an exemplary embodiment illustrated by the attached drawings in which:

FIG. 1 is a side elevation view of the disc brake partially in a vertical section along the line 1—1 of FIG. 2, FIG. 2 is a plan view of the disc brake with a partial cutaway at the level of a pin, and FIG. 3 is an elevation view of a radial section of the disc brake along the line III—III in FIGS. 1 and 2.

The disc brake, as illustrated in the attached drawings, incorporates a caliper 1 straddled above a part of the periphery of a brake disc 2 rotatable about an axle (not shown). Near its two front and rear ends, the caliper 1 is mounted to slide, by means of two pins 3, 4 secured to a fixed support 5, in the corresponding bearings formed in the caliper 1 in such a way as to be capable of sliding parallel to the axis of the brake disc 2. The caliper 1 has a peripheral assembly orifice 6 which is of rectangular shape and which is provided in the caliper 1 to allow the passage of the active part of the outer friction pad 7 and inner friction pad 8. The inner pad 8 interacts directly with a brake motor 9 incorporated in the caliper 1, while the outer pad interacts indirectly with said motor 9 by bearing against the head 10 of said caliper 1. Each friction pad 7 and 8 comprises, on the same side as the caliper 1, a lining-holder plate 11, 12 made of a suitable metal, and, on the same side as the brake disc 2, a friction lining 13, 14 which is applied against the corresponding side face of the brake disc 2 when the motor 9 is actuated.

The front and rear sides of the passage orifice 6 of the caliper 1 are delimited respectively by a guide edge 15 and 16 which extends parallel to the axis of the brake disc and which interacts with one of the two bearing noses 17, 18 or 19, 20 of the lining-holder plate 11 or 12 of the outer pad 7 or the inner pad 8.

The two friction pads 7 and 8 are arranged in the caliper 1 on either side of the brake disc 2 and are attached to the caliper by means of the end bearing noses 17, 18 and 19, 20 which match the V-shape of the guide edges 15 and 16. These pads 7 and 8 are locked against any radial displacement in the caliper 1 by means of a locking key 22 introduced into the gap delimited by a guide edge, for example 15, and the adjacent bearing noses 17 and 19 of the pads 7 and 8, a pin 23 interacting with the key 22 and the corresponding guide edge 15 to prevent any untimely displacement of said key 22. It is expedient to point out that the internal structural of the caliper and the system for assembling and locking the pads in relation to the caliper do not form part of the present invention and are furthermore described in detail in French Pat. No. 77 34 537 (2,409,423), so that there is no need to described in any more detail the general structure of the disc brake which is the subject of the present invention.

According to the invention, the caliper 1 is placed by means of its front ends 34 and 35, without appreciable play, between a front stop 26 and a rear stop 27. These stops 26, 27 take the form of a transverse bar extending parallel to the axis of the brake disc 2 above the latter over length at least equal to the width of the space occupied by the two friction pads 7 and 8. Each of these stops 26, 27 is carried by a lateral arm 28, 29 secured to a lateral fixed support 30 provided on the inner sides of the brake disc 2.

The fixed support 30 for the lateral supporting arms 28 and 29 of the stops 26 and 27 can consist of an independent fixed support or can be merged with the fixed support 5 in which the pins 3 and 4 for the sliding of the caliper 1 are mounted. To prevent any substantial play between the caliper 1 and the two stops 26 and 27, there are on the front face 24 and on the rear face 25 of the caliper 1 two lateral bearing heads 31, 32 and 33, 34 which are located opposite the ends of the each stop 26 and 27. Particularly the fixed support 30 and the fixed support 5 can be produced directly in the stub-axle support of the vehicle.

The embodiment described above can undergo a number of modifications without thereby departing from the scope of protection defined by the appended modifications. The alternative forms include mounting an elastic sleeve between the pins and the corresponding bores forming bearings in the caliper. In this alternative form, as a result of compression of the said sleeves, the caliper will come systematically in contact with the stops 26, 27 in order to transmit all the braking torque to the fixed support 30, and in this case the pins receive practically no torque and serve merely for the sliding of the caliper in proportion to the wear of the friction elements 6 and 8.

I claim:

1. A disc brake of the type incorporating a sliding caliper located above a peripheral part of a brake disc and having therein a rectangular peripheral passage orifice for radially outward removal of inner and outer friction pads located in the caliper on both sides of the brake disc, the pads supported by means of respective bearing noses engaging guide edges and resting against bearing and guide faces of the caliper, a fixed support secured to a frame and supporting the caliper, two support and guide pins disposed parallel to an axis of the disc and secured to the fixed support to guide the caliper by means of corresponding bearings formed in the caliper, a control motor mounted on an inner part of the caliper and capable of displacing the inner friction pad in the direction of the outer friction pad which bears against the caliper, the caliper disposed so that a circumferential front face and a circumferential rear face of the caliper are disposed between respective circumferentially outer stops comprising a front fixed stop and a rear fixed stop disposed stationary relative to the frame, each of the fixed stops extending parallel to the axis of the brake disc and across to both sides of the disc for a length at least equal to a distance occupied by the friction pads, each of the fixed stops provided on a lateral support arm secured to a fixed lateral support disposed on an inner side of the brake disc, the pins being disposed circumferentially inwardly of the front face and rear face of the caliper, and each face of the caliper having lateral bearing heads located opposite a respective lateral support arm and extending circumferentially outwardly from the respective face to define a minimal clearance distance between the respective bearing head and lateral support arm so that circumferential movement of the caliper relative to the fixed lateral support causes one of the bearing heads to engage the respective lateral support arm.

2. The disc brake according to claim 1, wherein the fixed lateral support of the front and rear stops for the caliper comprises the fixed support for the guide pins.

3. The disc brake according to claim 1, wherein each stop comprises a bar that extends across the disc.

4. The disc brake according to claim 1, wherein each face of the caliper has two of said bearing heads spaced axially apart from one other, the axial spacing therebetween, respective face and fixed lateral support arm defining an enlarged clearance distance.

5. The disc brake according to claim 4, wherein the bearing heads provide flat surfaces for engaging a flat portion of an associated lateral support arm.

* * * * *